(12) United States Patent
Jung (10) Patent No.: US 7,788,374 B2
(45) Date of Patent: Aug. 31, 2010

(54) METHOD AND APPARATUS FOR DISPLAYING BROWSER IN PORTABLE TERMINAL

(75) Inventor: Sung Won Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 12/203,034

(22) Filed: Sep. 2, 2008

(65) Prior Publication Data

US 2009/0083402 A1 Mar. 26, 2009

(30) Foreign Application Priority Data

Sep. 21, 2007 (KR) .................... 10-2007-0096609

(51) Int. Cl.
*G06F 15/173* (2006.01)
(52) U.S. Cl. .................. 709/224; 709/206; 709/217; 709/228
(58) Field of Classification Search .......... 709/206, 709/207, 217, 224, 228, 246; 715/234
See application file for complete search history.

(56) References Cited

U.S. PATENT DOCUMENTS

| | | | | |
|---|---|---|---|---|
| 6,157,924 A * | 12/2000 | Austin | ................... | 707/999.01 |
| 6,311,215 B1 * | 10/2001 | Bakshi et al. | ................ | 709/236 |
| 6,757,739 B1 * | 6/2004 | Tomm et al. | ................ | 709/236 |
| 7,512,658 B2 * | 3/2009 | Brown et al. | ................ | 709/206 |
| 2003/0055907 A1 * | 3/2003 | Stiers | ......................... | 709/206 |
| 2005/0138210 A1 * | 6/2005 | Shkvarchuk et al. | ........ | 709/246 |
| 2007/0224979 A1 * | 9/2007 | O'Neal et al. | ................ | 455/417 |
| 2010/0011078 A1 * | 1/2010 | Shkolnikov et al. | ......... | 709/206 |

\* cited by examiner

*Primary Examiner*—Ramy M Osman
(74) *Attorney, Agent, or Firm*—Jefferson IP Law, LLP (57) ABSTRACT

A method and system are provided which enhance a browser function in a portable terminal by controlling MIME types to be received and processed according to a network condition. User's preferred one or more MIME types can be previously set. When the portable terminal is connected to the server, it determines whether data transmission rate, use state and memory use state of the portable terminal are normal or abnormal. When the communication condition is abnormal, the portable terminal can control MIME types transmitted from the server. Although all the MIME types have been already received from the server, when the use state and memory use state of the portable terminal is abnormal, the portable terminal extracts the one or more MIME types set by a user and then releases memory resources that have been already allocated, thereby enhancing the browser performance.

13 Claims, 10 Drawing Sheets

| TXT |
| JPG |
| MP3 |
| AVI |
| ⋮ |

FIG. 6D

| TXT |
| JPG |

METHOD AND APPARATUS FOR DISPLAYING BROWSER IN PORTABLE TERMINAL

PRIORITY

This application claims the benefit under 35 U.S.C. §119(a) of a Korean patent application filed in the Korean Intellectual Property Office on Sep. 21, 2007 and assigned Serial No. 2007-0096609, the entire disclosure of which is hereby incorporated by reference.

BACKGROUND OF THE INVENTION

1. Field of the Invention

The present invention relates to a method and system for enhancing performance of a browser in a mobile communication terminal. More particularly, the present invention relates to a portable terminal that enables a user to set his/her preferred Multipurpose Internet Mail Extension (MIME) types and receive only a particular MIME type, previously set by the user, from a server according to data transmission rate, use state of the portable terminal and memory availability.

2. Description of the Related Art

In recent years, portable terminals have been developed as a multimedia device that can provide a variety of additional services such as an electronic organizer function, a game function, a schedule managing function, etc. A representative example of the added services is a wireless communication service. Wireless communication service refers to a service that allows portable terminals to wirelessly transmit/receive information through text, numbers, graphics, etc., and also enables portable terminals, if a web browser is installed, to access the Internet.

However, conventional web browsers installed in portable terminals are operated without considering the network condition for a data service, the use state of portable terminals, and memory availability, which vary in real time between browsing operations. Therefore, when the data transmission rate is slow, the portable terminal takes a long time to download a large amount of images. Although the portable terminal receives a large amount of images over a relatively long period of time, when the available memory capacity is low or a Central Processing Unit (CPU) is overloaded, the portable terminal may display an error message or may not provide downloaded information to a user.

Therefore, when a network condition for data service is abnormal, a method is required to enable a particular MIME type set by a user to be downloaded from a server. In addition, even if the network condition is normal and thus a portable terminal receives data from a server, the portable terminal still has a problem in its use state or a lack of memory capacity, so a method is required to process only a particular MIME type that is set by a user.

SUMMARY OF THE INVENTION

An aspect of the present invention is to address at least the above-mentioned problems and/or disadvantages and to provide at least the advantages described below. Accordingly, an aspect of the present invention is to enable a user to set his/her preferred one or more MIME types in a portable terminal and enable the portable terminal to receive and process only the one or more MIME types that are previously set by the user when the communication condition is abnormal. Another aspect of the present invention is to enable a portable terminal to extract and process only a previously set one or more MIME types from data received by the portable terminal when the portable terminal is performing another operation or the memory capacity is low, thereby enhancing the web browser function of the portable terminal.

In accordance with an aspect of the present invention, a portable terminal is provided. The portable terminal includes a Radio Frequency (RF) communication unit, an input unit, a display unit, an audio processing unit, a storage unit, and a controller. The portable terminal can set a particular one or more MIME types set by a user before connecting to a server through a web browser. In particular, the controller can generate a request signal for selectively receiving only a particular one or more MIME types previously set by a user, when a communication condition, a use state of a portable terminal, or a memory state is abnormal, and then can transmit it to a server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Prior to explaining the exemplary embodiments of the present invention, terminologies will be defined for the present description below.

A portable terminal according to exemplary embodiments of the present invention may be a mobile communication terminal, Personal Digital Assistant (PDA) terminal, smart phone, International Mobile Telecommunication 2000 (IMT-2000) terminal, Universal Mobile Telecommunication Service (UMTS) terminal, etc.

Multipurpose Internet Mail Extension (MIME) is an Internet standard that extends the Simple Mail Transfer Protocol (SMTP) for email transmission across the Internet without converting multimedia data into American Standard Code for Information Interchange (ASCII), in which the multimedia data may be texts in character sets other than ASCII, picture, voice, images, etc. For example, MIME may have any one of the formats of text, multipart, message, application, images, video, audio, etc. More specifically, the format of video has sub-formats, such as an audio video interleaving (AVI), a Moving Picture Expert Group (MPEG), etc.

"Data fetching" referred to in the description of the exemplary embodiments of present application refer to a process where a browser of a portable terminal requests data from a server through a gateway and receives data transmitted from the server in response to the request. "Parsing" refers to a process where encoded data is decoded and then compiled to machine code. "Rendering" refers to a process in which data, received and analyzed through the fetching and parsing, is formed into a 2- or 3-dimensional image and then displayed through the browser.

"First profile" referred to in the description of the exemplary embodiments of the present application refers to a file that includes information about the types of MIME which can be supported by a user's portable terminal. "Second profile" refers to the file that includes user's preferred MIME types that are selected and set by a user from the MIME types of the first profile.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
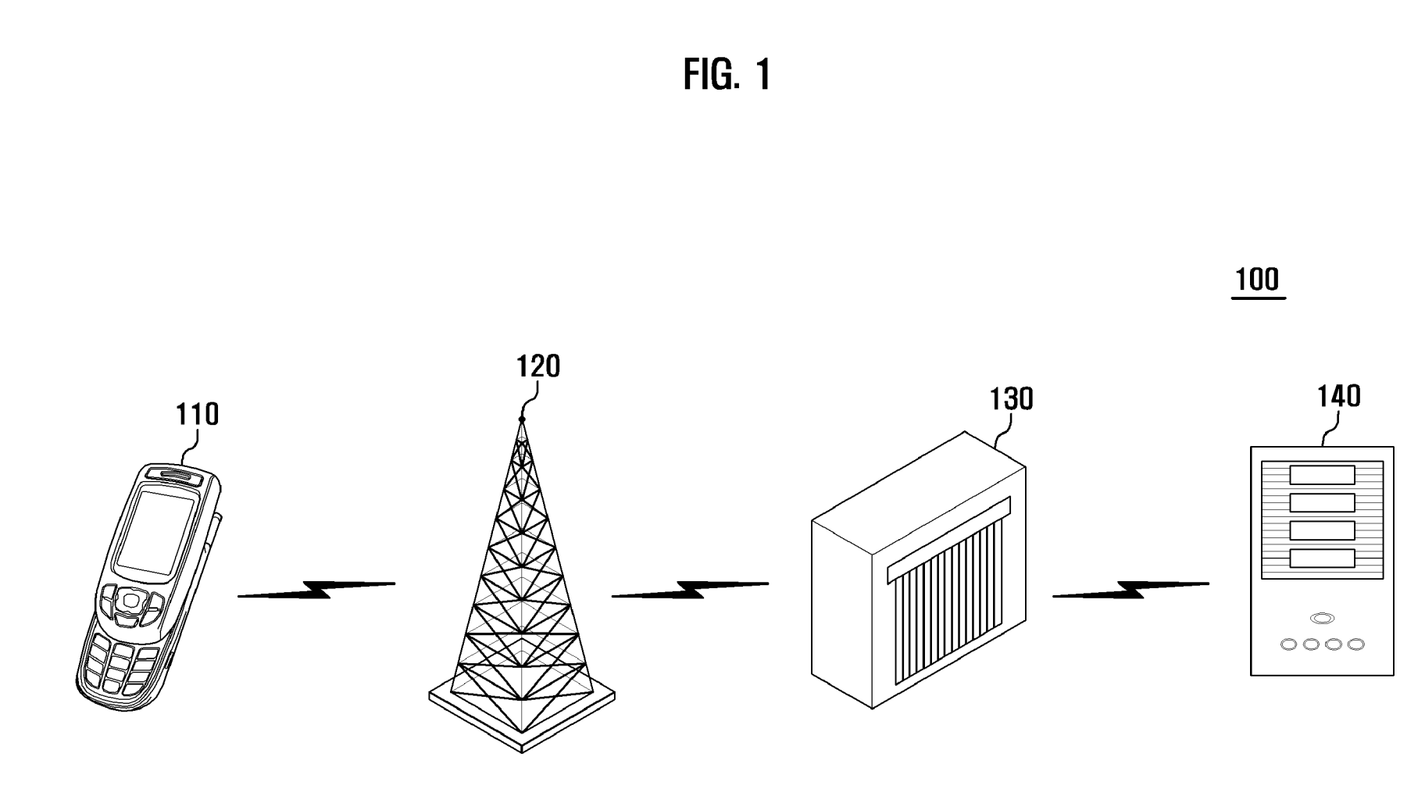
FIG. 1 is a view illustrating a wireless Internet service system according to an exemplary embodiment of the present invention.

FIG. 1 is a view illustrating a wireless Internet service system 100 according to an exemplary embodiment of the present invention.

As illustrated in FIG. 1, the wireless Internet service system 100 includes a portable terminal 110, a base station 120, a gateway 130, and a server 140.

The portable terminal 110 may be a mobile communication terminal, Personal Digital Assistant (PDA) terminal, smart phone, International Mobile Telecommunication 2000 (IMT-2000) terminal, Universal Mobile Telecommunication Service (UMTS) terminal, etc. More particularly, the portable terminal 110 allows a user to set his/her preferred MIME type and generate a request signal for selectively receiving only a particular MIME type.

The base station 120 refers to a wireless station that communicates with mobile electronic devices and repeats radio wave signals between portable terminals. More particularly, the base station 120 allows the portable terminal 110 to connect to server 140 and use a wireless Internet service.

The gateway 130 serves as a function module or a function device that connects between a plurality of different or similar types of communication networks, so that information can be exchanged therebetween. The gateway may be a function module or a function device that connects between a plurality of communication networks that are incompatible since their protocols differ from each other in the respective layers of the OSI model and converts one protocol into another between the communication networks. That is, the gateway 130 can convert one protocol into another between a plurality of different communication networks whose protocols are different from each other and thus can allow information to be exchanged therebetween.

The server 140 is connected to a variety of communication components including a base station 120, etc. and provides services for portable terminal users. In particular, the server 140 can identify a particular MIME type that is included in a request signal transmitted from a portable terminal 110 and can transmit only that particular MIME type to the portable terminal 110.

Figure 2:
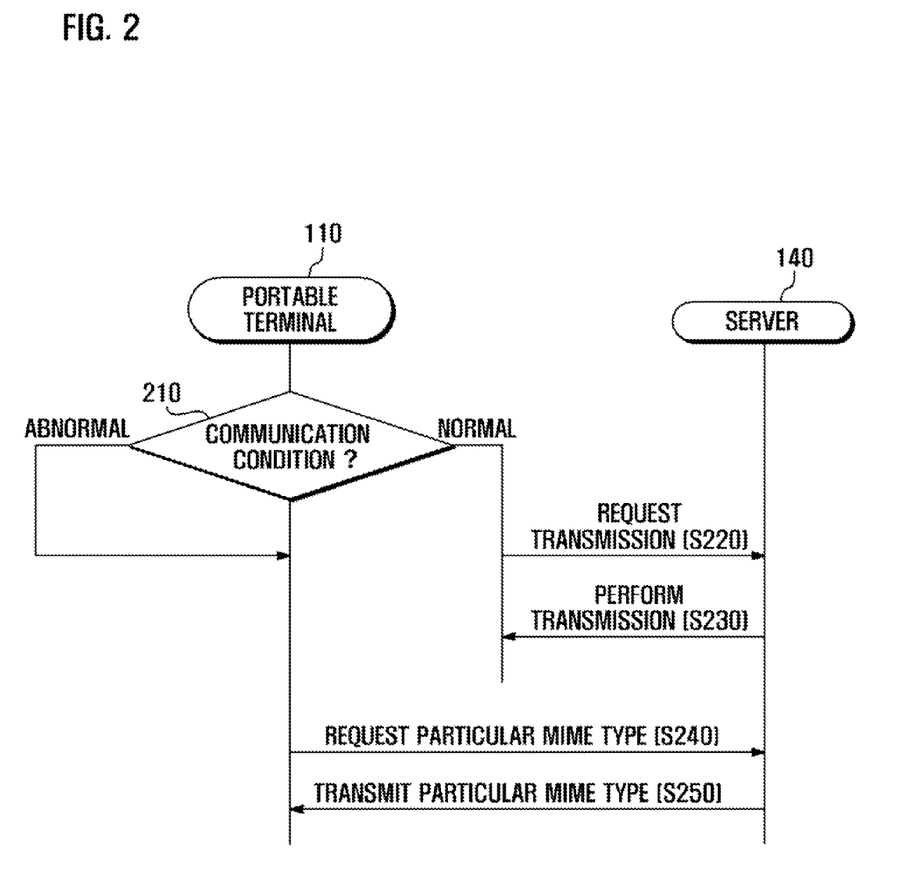
FIG. 2 is a view illustrating a method for controlling MIME types that a portable terminal receives according to a communication condition, according to an exemplary embodiment of the present invention.

FIG. 2 is a view illustrating a method for controlling a MIME type that the portable terminal 110 receives according to a communication condition according to an exemplary embodiment of the present invention.

When the portable terminal 110 is connected to the server 140 through a browser, it determines whether a communication condition is normal or abnormal in step S210. When the portable terminal 110 determines that a communication condition is normal at step S210, it requests a normal service to the server in step S220. In response to the service request, the server 140 transmits all its MIME types to the portable terminal 110 in step S230. The portable terminal 110 performs parsing and rendering with all the received MIME types and displays received contents.

When the portable terminal 110 determines that a communication condition is abnormal at S210, it generates a signal for requesting only a particular MIME type that is previously set by a user and then transmits the signal to the server 140 in step S240. In response to the request of the signal including the particular MIME type, the server 140 extracts only the particular MIME type and then transmits it to the portable terminal 110. The portable terminal 110 performs parsing and rendering with the received particular MIME type and displays received contents.

Figure 3:
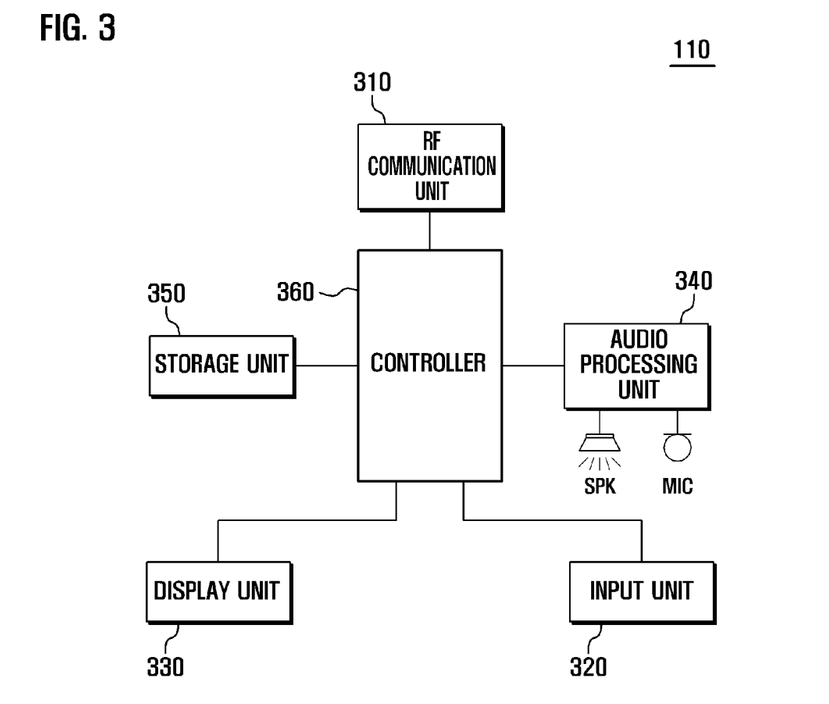
FIG. 3 is a schematic block diagram illustrating a portable terminal installing an improved browser, according to an exemplary embodiment of the present invention.

FIG. 3 is a schematic block diagram illustrating a portable terminal installing an improved browser, according to an exemplary embodiment of the present invention. The portable terminal 110 includes an RF communication unit 310, an input unit 320, a display unit 330, an audio processing unit 340, a storage unit 350 and a controller 360.

The RF communication unit 310 includes an RF transceiver, a duplexer, etc. and serves to transmit and receive RF signals. More particularly, the RF communication unit 310 transmits a signal for requesting information including a Uniform Resource Locator (URL) and a signal for requesting a particular MIME type to the server and receives data, in response to the request signal, from the server.

The input unit 320 may be a key pad, a touch screen or a touch pad. The input unit 320 receives user's commands, for example a command that a user inputs to obtain his/her preferred information. In particular, the input unit 320 is used to set a particular MIME type that is selected by a user.

The display unit 330 may be a Liquid Crystal Display (LCD), Organic Light Emitting Diode (OLED), etc. and displays a variety of data generated in the portable terminal and operational states of the portable terminal on the screen. When the display unit 330 is implemented by a touch screen, it can also serve as an input device.

The audio processing unit 340 includes a microphone for inputting external sounds and a speaker for outputting audio signals.

The storage unit 350 stores programs required for the operations of the portable terminal and data generated in the portable terminal. The storage unit 350 may includes one or more of a Read-Only Memory (ROM), non-volatile memory (a flash memory or an Electrically Erasable Programmable Read-Only Memory (EEPROM)), and a Random Access Memory (RAM). In particular, the storage unit 350 can store information about a particular MIME type that is previously set by a user.

The controller 360 controls the operations of the portable terminal. More particularly, the controller 360 extracts all of the MIME types that can be supported by a browser in the portable terminal and generates a first profile for the extracted MIME types. The first profile refers to a file that records information about MIME types that can be supported in a user's portable terminal. When a user selects one of the MIME types included in the first profile and sets it in the portable terminal, the second profile for the particular MIME type is generated. The second profile refers to a file that stores user's selected MIME types from among the MIME types included in the first profile. The controller 360 can determine and store the data transmission rate, use state, and memory use information of a portable terminal.

When the portable terminal 110 is connected to the Internet through the browser, the controller 360 determines the data transmission rate and determines whether a communication condition is normal. The portable terminal 110 can store a reference transmission rate to determine whether a communication condition is normal. When the portable terminal 110 is connected to the server through the browser, the controller 360 measures a data transmission rate. The controller 360 compares the measured data transmission rate with the reference transmission rate. When the measured data transmission rate is greater than the reference transmission rate, the controller 360 determines that a communication condition is normal and receives all the MIME types from the server 140. On the contrary, when the measured data transmission rate is less than the reference transmission rate, the controller 360 determines that a communication condition is abnormal, generates a request signal for receiving only one particular MIME type that was previously set by a user and transmits the request to the server 140.

The controller 360 determines the state of the portable terminal and determines whether the portable terminal can provide a download service even when a communication condition is normal. That is, the controller 360 determines whether the portable terminal 110 is in a call service mode, an SMS service mode or a hand-off process and then determines whether the portable terminal can receive and process all the MIME types transmitted from the server 140. When the controller 360 determines that the portable terminal 110 is in a normal state, it receives all the MIME types from the server 140. On the contrary, when the controller 360 determines that the portable terminal 110 is in an abnormal state, it generates a signal for requesting a particular MIME type that has previously been set by a user and then transmits the request to the server 140.

The controller 360 can determine the state of the portable terminal 110 and collect information about the memory use state of the portable terminal 110. The memory use state refers to a memory occupancy that denotes an available memory capacity of the entire memory capacity, which is allocated to execute a currently used program. The portable terminal 110 can store a reference remaining memory capacity to determine whether the memory is in a normal state. When the portable terminal 110 is connected to the server, its current memory occupancy is measured by the controller 360. When the measured memory occupancy is less than the reference remaining memory capacity, the controller 360 determines that the memory capacity is sufficient and accordingly that the memory is in a normal state. Therefore, the controller 360 receives all the MIME types from the server 140. However, when the measured memory occupancy is greater than the reference value of the remaining memory capacity, the controller 360 determines that most of the memory capacity is in use and accordingly that the memory is in an abnormal state. Therefore, the controller 360 generates a signal for requesting a particular MIME type that was previously set by a user and then transmits the request to the server 140.

Figure 4:
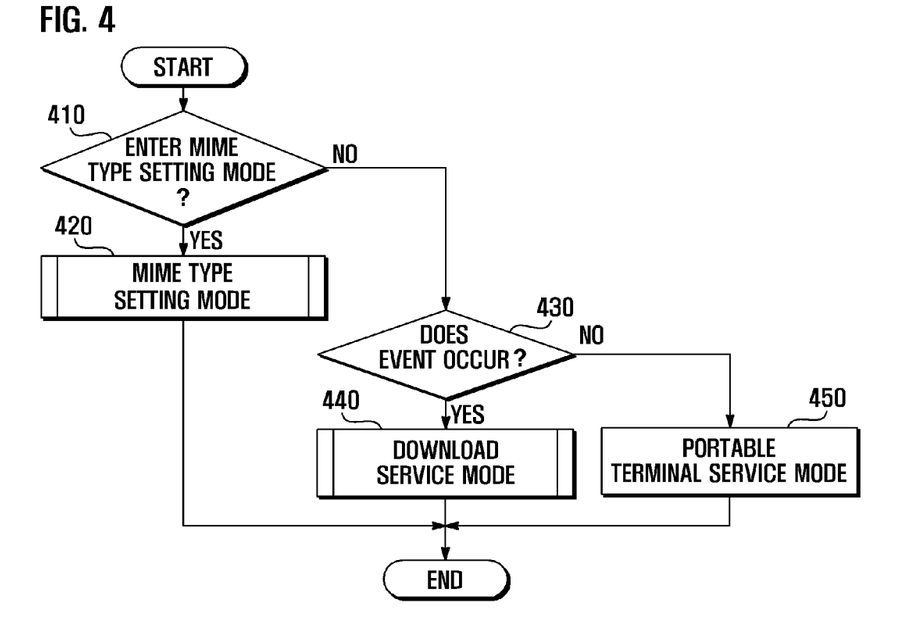
FIG. 4 is a flowchart illustrating a method for setting a user's preferred MIME type and for controlling a MIME type that is intended to be downloaded when an event occurs, according to an exemplary embodiment of the present invention.

FIG. 4 is a flowchart illustrating a method for setting a user's preferred MIME type and for controlling a MIME type that is intended to be downloaded when an event occurs, according to an exemplary embodiment of the present invention.

First, the controller 360 determines whether the portable terminal 110 is to enter a mode for setting a MIME type in step S410. When the controller 360 determines that the portable terminal 110 is to enter a MIME type setting mode at step S410, it controls a service mode for setting a MIME type in step S420.

On the contrary, when the controller 360 determines that the portable terminal 110 is not to enter a MIME type setting mode at step S410, it determines whether an event occurs in the portable terminal in step S430. Examples of the event may be that the portable terminal is connected to a server through a browser or is downloading particular content. When an event has occurred at step S430, the controller 360 controls a download service mode in step S440. However, when an event has not occurred at step S430, the controller 360 controls a service mode that is generally provided by the portable terminal in step S450.

Figure 5:
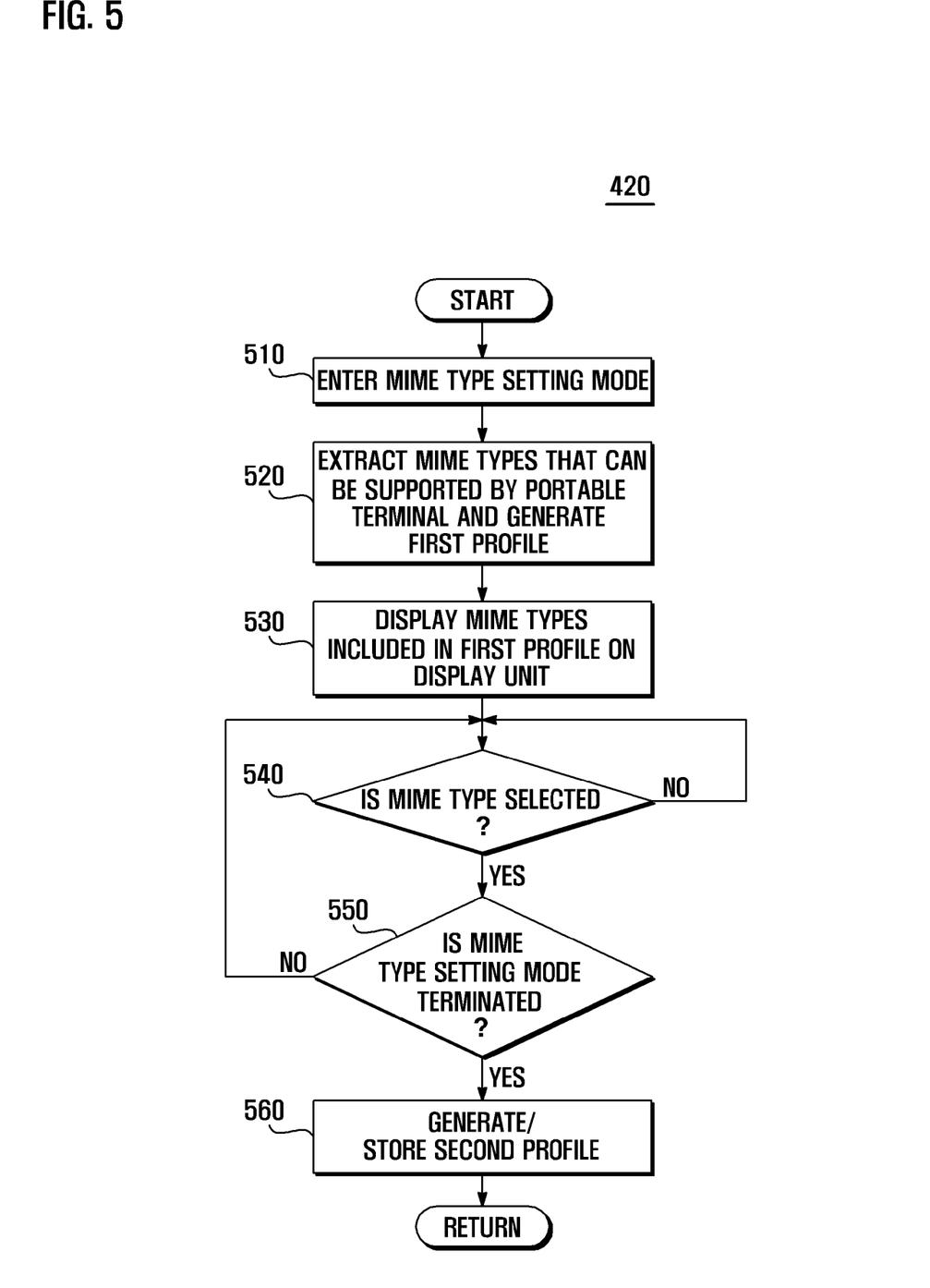
FIG. 5 is a flowchart illustrating a method for setting a user's MIME type before a portable terminal is connected to a server through its browser, according to an exemplary embodiment of the present invention.

FIG. 5 is a flowchart illustrating a method for setting a user's MIME type before a portable terminal is connected to a server through its browser, according to an exemplary embodiment of the present invention.

Figure 6A:
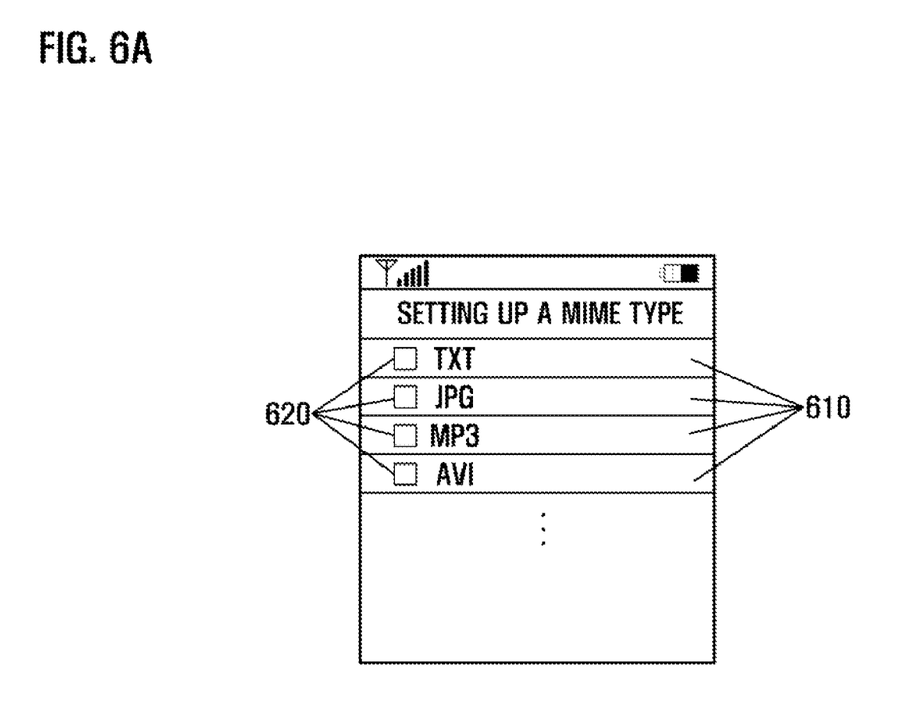
FIG. 6A is a view illustrating a screen for setting a MIME type according to an exemplary embodiment of the present invention.
Figure 6B:
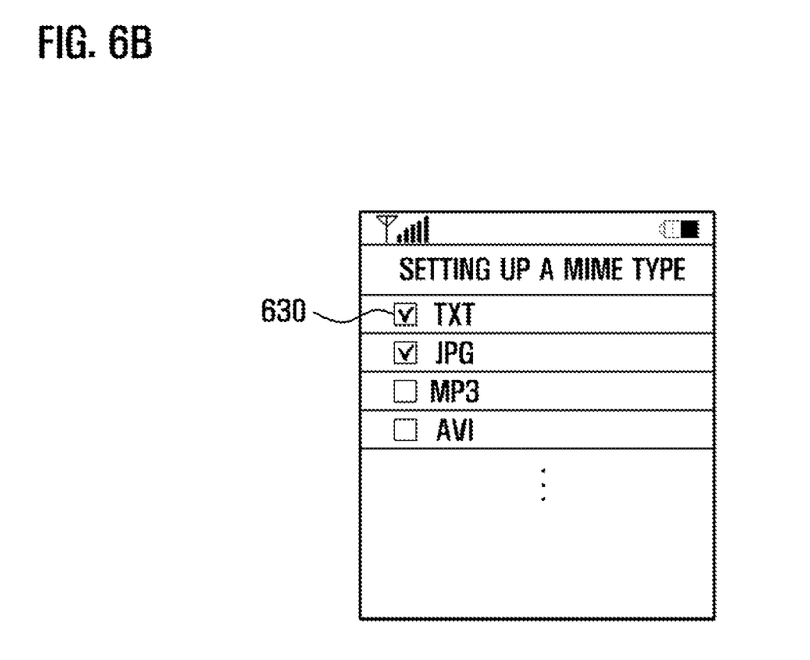
FIG. 6B is a view illustrating an interface that sets user's MIME types through a screen for setting a user's preferred MIME type, according to an exemplary embodiment of the present invention.
Figure 6C:
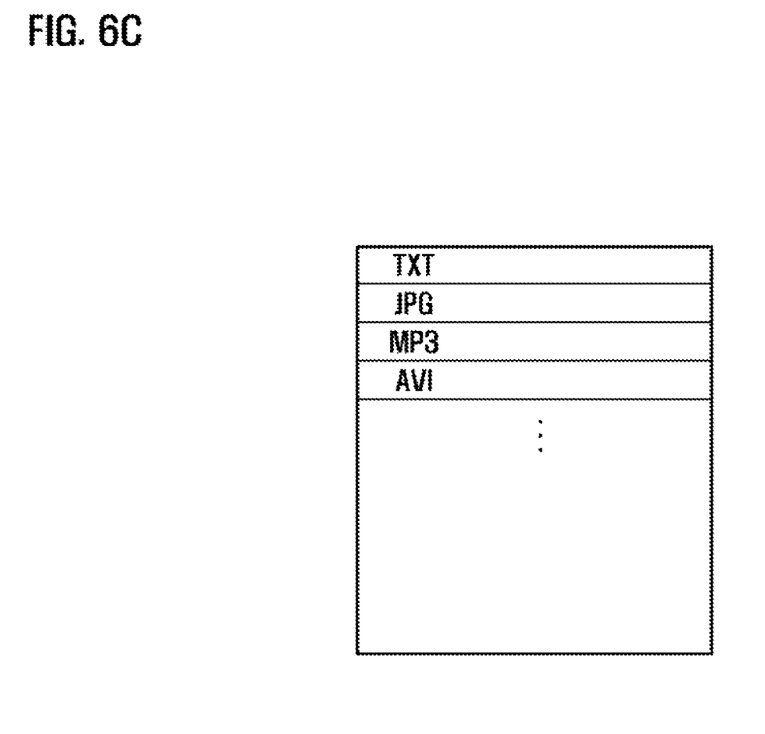
FIG. 6C is a view illustrating a screen that displays information about all MIME types, stored in the first profile and supported by a browser of the portable terminal, according to an exemplary embodiment of the present invention.
Figure 6D:
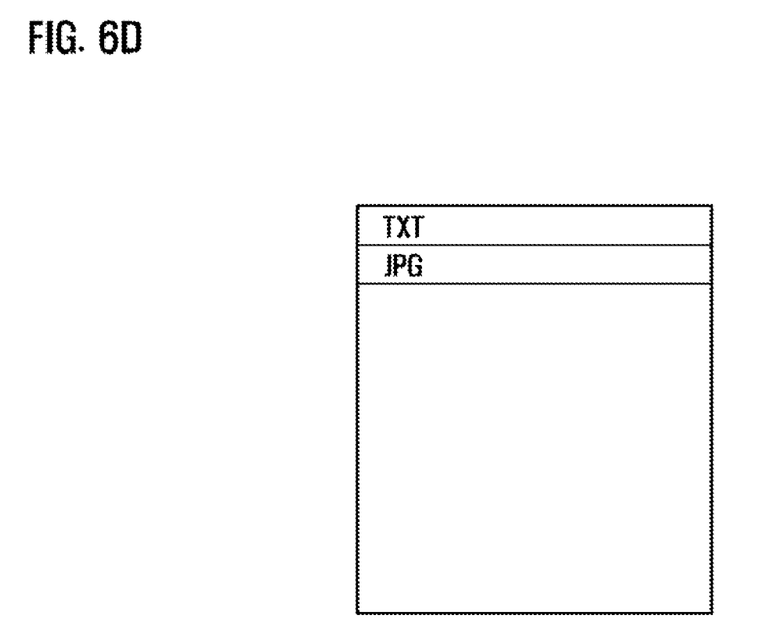
FIG. 6D is a view illustrating a screen that displays information about user's preferred MIME types stored in the second profile, according to an exemplary embodiment of the present invention.

The controller 360 determines that the portable terminal 110 enters a MIME type setting mode as a user operates the input unit 320 in step S510. After that, the controller 360 extracts all the MIME types that can be supported by the browser in the portable terminal and then generates the first profile in step S520. Here, the "first profile" refers to the file that includes information about MIME types that are supportable in a user's portable terminal. An example of the generated first profile is illustrated in FIG. 6C. After generating the first profile at step S520, the controller 360 controls the display unit 330 to display all the MIME types stored in the first profile in step S530, an example of which is illustrated in FIG. 6A. The MIME types may be one or more of formats, text, multipart, message, application, images, video, audio, etc. The MIME types may be displayed as file extension names 610 on the screen of the display unit 330. The file extension names corresponding to the MIME types may have check boxes 620 to allow for the selection thereof, and may be displayed to their left. It is preferable that the MIME types, text, image, audio source, moving images, etc. are generally aligned in ascending order according to a size of the data. After that, the controller 360 detects whether the user selects his/her preferred MIME type in the portable terminal through the input unit 320 in step S540. FIG. 6B illustrates an exemplary embodiment of an interface for setting a user's MIME type. As illustrated in FIG. 6B, the user can set his/her preferred MIME types in the portable terminal by checking corresponding check boxes 620 with a check mark 630 through the input unit 320. The controller 360 determines whether the MIME type setting mode is terminated in step S550. When the controller 360 determines that the MIME type setting mode is terminated at step S550, it generates the second profile and stores the file in the storage unit 350 in step S560. The "second profile" refers to the file that includes user's preferred MIME types that are selected and set by a user from the MIME types in the first profile. An exemplary second profile, as illustrated in FIG. 6D, includes information about user's preferred MIME types.

Figure 7:
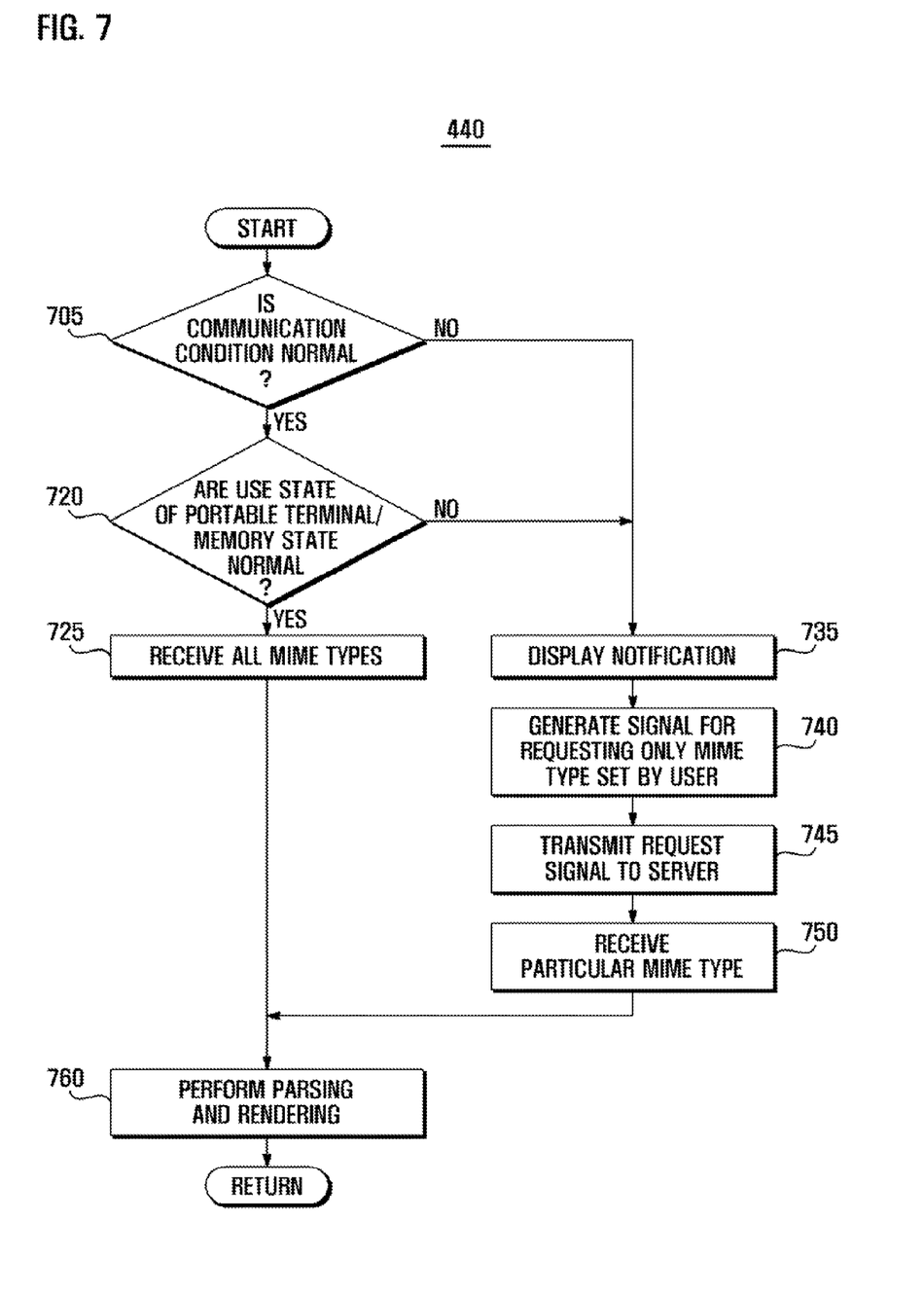
FIG. 7 is a flowchart illustrating a method for controlling download services in a portable terminal when an event occurs, such as an operation of connecting to a server through a browser or an operation of downloading particular content from a server, according to an exemplary embodiment of the present invention.

FIG. 7 is a flowchart illustrating a method for controlling download services in a portable terminal when an event occurs, such as an operation of connecting to a server through a browser or an operation of downloading particular content from a server, according to an exemplary embodiment of the present invention.

First, the controller 360 determines a data transmission rate of the portable terminal when an event occurs and then determines whether a communication condition is normal in step S705. To this end, the portable terminal stores the reference transmission rate. The controller 360 measures a data transmission rate when the portable terminal 110 is connected to the server through a browser. It compares the measured data transmission rate with the reference transmission rate. When the measured data transmission rate is greater than the reference transmission rate, the controller 360 determines that a communication condition is normal. However, when the measured data transmission rate is less than the reference transmission rate, the controller 360 determines that a communication condition is abnormal.

When a communication condition is normal, the controller 360 collects information about a state and/or a memory use state of the portable terminal in step S720. That is, the controller 360 determines whether the portable terminal 110 is in a call service mode, an SMS service mode or a hand-off process and then determines whether the portable terminal can receive and process all the MIME types from the server. The controller 360 determines the state of the portable terminal 110 and, at substantially the same time, determines and stores information about a memory use state of the portable terminal. The memory use state refers to a memory occupancy that denotes an available memory capacity of the entire memory capacity, which is allocated to execute a currently used program. The portable terminal 110 stores a reference remaining memory capacity to determine whether the memory is in a normal state. When the portable terminal 110 is connected to the server, its current memory occupancy is measured by the controller 360. When the measured memory occupancy is less than the reference remaining memory capacity, the controller 360 determines that the memory capacity is sufficient and accordingly the memory is in a normal state. However, when the measured memory occupancy is greater than the reference of the remaining memory capacity, the controller 360 determines that most of the memory capacity is in use and accordingly the memory is in an abnormal state.

Figure 9A:
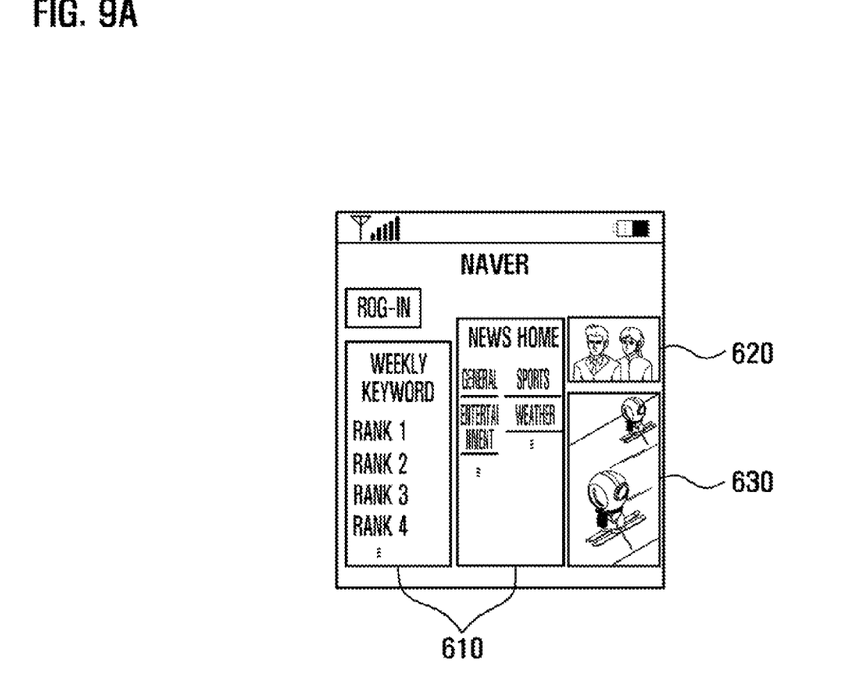
FIG. 9A is a view illustrating a screen of a portable terminal, on which all MIME types transmitted from a server are displayed, when a communication condition, a use state, and a memory use state are all normal in the portable terminal, according to an exemplary embodiment of the present invention.

When the controller 360 determines that the use state and/or the memory of the portable terminal are/is normal at step S720, it controls the RF communication unit 310 and receives all the MIME types transmitted from the server in step S725. After that, the controller 360 performs a parsing and a rendering for all the received MIME types in step S760 and then displays the received contents on the display unit 330. FIG. 9A illustrates an exemplary embodiment of a screen of a display unit 330, on which all MIME types transmitted from a server are displayed, when a communication condition, a use state, and a memory use state are all normal in the portable terminal. As illustrated in FIG. 9A, the portable terminal receives all MIME types, such as text 610, picture 620, moving image 630, etc., from the server and displays them on the display unit 330.

Figure 8A:
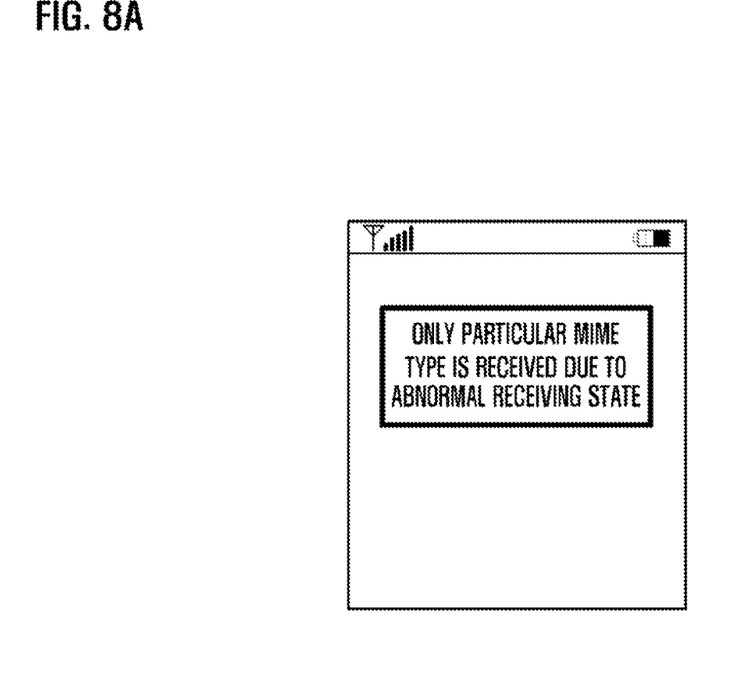
FIG. 8A is a view illustrating a screen that displays abnormal communication condition, according to an exemplary embodiment of the present invention.
Figure 8B:
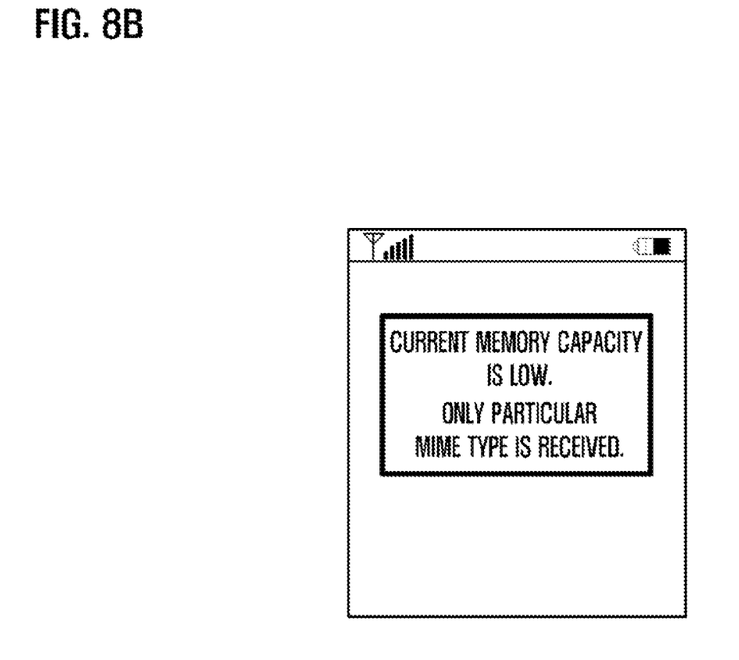
FIG. 8B is a view illustrating a screen that displays abnormal memory condition, according to an exemplary embodiment of the present invention.
Figure 9B:
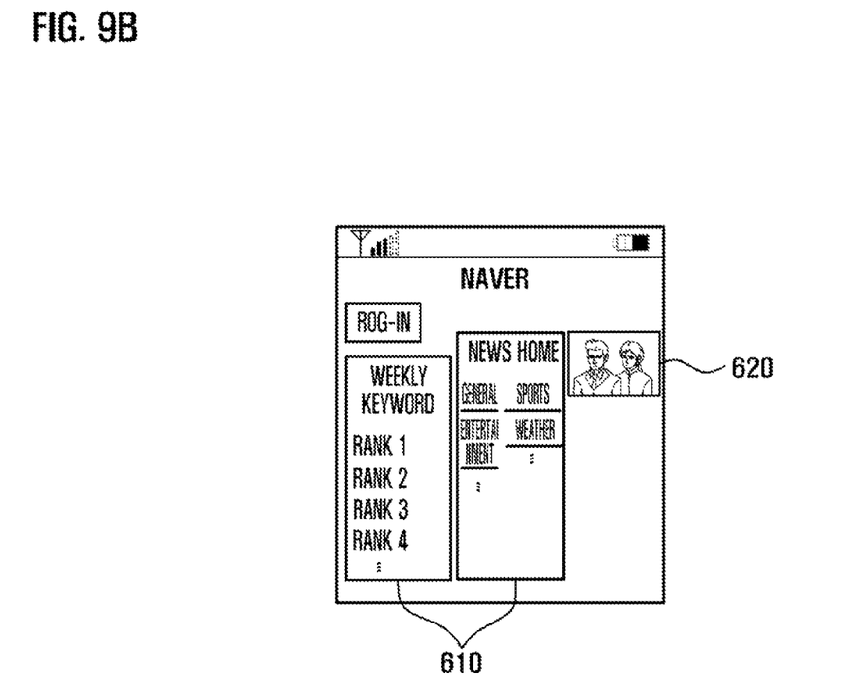
FIG. 9B is a view illustrating a screen of a portable terminal, on which a particular MIME type transmitted from a server is displayed, when any one of the communication condition, use state, and memory use state is abnormal in the portable terminal, according to an exemplary embodiment of the present invention.

On the contrary, when the controller 360 determines that any one of the communication condition and the use state and the memory of the portable terminal is abnormal at step S705 or step S720, it controls the display unit 330 to display that a communication condition or the memory state is in an abnormal state in step S735, as illustrated by the examples in FIG. 8A and FIG. 8B. After that, the controller 360 generates a request signal for receiving only a particular MIME type, referring to the second profile stored in the storage unit 350 in step S740. The controller 360 controls the RF communication unit 110 to transmit the request signal to the server connected to the portable terminal in step S745. After receiving the request signal, the server selects only particular MIME types therefrom, which correspond to the request signal, and then transmits them to the portable terminal. The controller 360 receives the particular MIME types from the server through the RF communication unit 310 in step S750. After that, the controller 360 performs a parsing and a rendering for the received particular MIME types in step S760 and then displays the received contents on the display unit 330 through the browser. FIG. 9B illustrates an exemplary embodiment of a screen of a display unit 330, on which received particular MIME types are displayed, when any one of the communication condition and the use state and the memory use state of the portable terminal is abnormal. The exemplary embodiment of FIG. 9B is implemented assuming that the user's preferred MIME type is a text and a picture in JPG format, and in that case, the portable terminal 110 receives only the text 610 and the picture 620, but not the moving image 630.

Therefore, when the communication condition is abnormal while the browser is operated in the portable terminal, MIME types that will require much time to perform data fetching do not perform data fetching, thereby saving operating time. Since such data fetching is not required, parsing and rendering operations can be skipped, thereby enhancing the performance of the browser.

Figure 10:
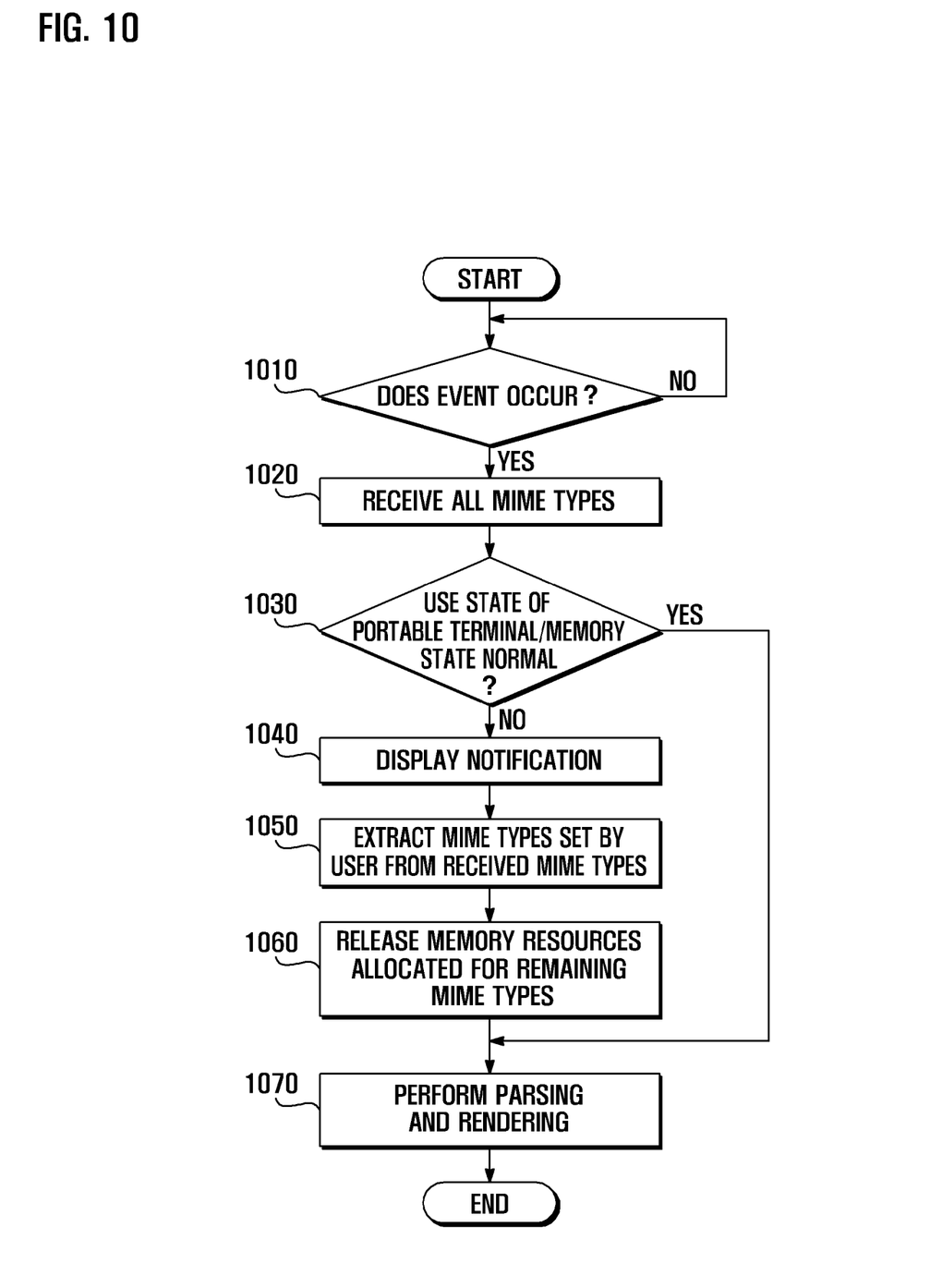
FIG. 10 is a flowchart illustrating a method for processing only a particular MIME type, in the case that the portable terminal has already received all MIME types from a server due to the occurrence of an event but a use state or a memory of a portable terminal is abnormal, according to an exemplary embodiment of the present invention.

FIG. 10 is a flowchart illustrating a method for processing only a particular MIME type, in the case that the portable terminal has already received all MIME types from a server due to the occurrence of an event but when a use state or a memory of a portable terminal is abnormal, according to an exemplary embodiment of the present invention.

When events occur in the portable terminal 110, the controller 360 recognizes the occurrence of the event in step S1010. Examples of the events may be that the portable terminal is connected to a server through a browser or downloading a particular content, etc. The controller 360 receives all MIME types from the server connected to the portable terminal through the RF communication unit 310 in step S1020. After that, the controller 360 determines whether the use state and the memory of the portable terminal are normal in step S1030. When the controller 360 determines that the use state and the memory of the portable terminal are normal at S1030, it performs parsing and rendering operations with the received all MIME types in step S1070 and displays the received contents on the display unit 330 using the browser.

However, when the controller 360 determines that the use state or the memory of the portable terminal is abnormal at step S1030, it controls the display unit 330 to display a notification and a schedule, as illustrated by the example in FIG. 8B, in step S1040. The controller 360 refers to the second profile, stored in the storage unit 150, and extracts only particular MIME types, set in the second profile, from all received MIME types in step S1050. The controller 360 releases the memory resources for MIME types of all MIME types received from the server, other than the particular MIME types set in the second profile, which are called the remaining MIME types, so that the memory capacity is sufficient during the operation in step S1060. The controller 360 performs parsing and rendering operations with the extracted particular MIME types and displays the received content on the display unit 330 using the browser in step S1070.

As described above, the portable terminal comprising a browser, according to exemplary embodiments of the present invention, does not receive all MIME types, when a communication condition, etc. is abnormal, but receives only one or more MIME types that are previously set by a user. In addition, although the portable terminal receives all MIME types from a server, the portable terminal processes only one or more particular MIME types that are previously set by a user when the portable terminal is performing another operation or the memory capacity is low. Therefore, the portable terminal does not make a user wait for a relatively long period of time to download data nor display an error message, such as a memory capacity is low, etc., on the display unit.

While the invention has been illustrated and described with reference to certain exemplary embodiments thereof, it will be understood by those skilled in the art that that various changes in form and details may be made therein without departing from the spirit and scope of the present invention as defined in the appended claims and their equivalents.

What is claimed is:

1. A portable terminal, the portable terminal comprising:
   a Radio Frequency (RF) communication unit for transmitting at least one of a first request signal and a second request signal to a server and for receiving data from the server based on the at least one of the first request signal and the second request signal;
   a storage unit for storing a first profile that includes information about one or more Multipurpose Internet Mail Extension (MIME) types supported by the portable terminal and a second profile, corresponding to the first profile, which stores information about one or more MIME types set by a user;
   a controller for analyzing a communication condition when an event occurs, for generating the first request signal including the one or more MIME types of the first profile when a communication condition is normal, for generating the second request signal including the one or more MIME types of the second profile when a communication condition is abnormal, and for processing the received data; and
   a display unit for displaying the processed data.

2. The portable terminal of claim 1, wherein the communication condition is analyzed by comparing a reference transmission rate stored in the portable terminal with a data transmission rate determined when the portable terminal is connected to the server.

3. The portable terminal of claim 2, wherein the controller determines at least one of a use state and a memory use state of the portable terminal and generates a signal for requesting the one or more MIME types of the second profile when the at least one of the use state and the memory use state is abnormal.

4. The portable terminal of claim 3, wherein the memory use state is determined by comparing a reference remaining memory capacity, stored in the portable terminal, with a determined memory occupancy when the portable terminal is connected to the server.

5. The portable terminal of claim 3, wherein the use state comprises at least one of a call service mode, a Short Message Service (SMS) service mode, and a hand-off process.

6. The portable terminal of claim 1, wherein the display unit displays check boxes that select extension names of MIME types and user's one or more selected MIME types.

7. The portable terminal of claim 6, wherein the extension names of the MIME types are arranged in ascending order in terms of data size.

8. A browser displaying method, the method comprising:
   determining whether a communication condition is one of normal and abnormal when an event occurs;
   generating, when the communication condition is normal, a first request signal for requesting one or more MIME types based upon a first profile;
   generating, when the communication condition is abnormal, a second request signal for requesting one or more MIME types based on a second profile set by a user;
   transmitting at least one of the first request signal and the second request signal to a server;
   receiving the one or more MIME types from the server corresponding to the transmitted at least one of the first request signal and the second request signal; and
   displaying the received one or more MIME types on a display unit.

9. The method of claim 8, wherein the first profile stores information about one or more MIME types that are supportable in a portable terminal and is generated, when the corresponding one or more MIME types are set in a MIME type setting mode, and wherein the second profile that stores information about one or more MIME types set by the user and is generated, when the MIME type setting mode is terminated.

10. The method of claim 8, wherein the determining of whether the communication condition is normal or abnormal comprises comparing a reference transmission rate stored in the portable terminal with a data transmission rate determined when the portable terminal is connected to the server.

11. The method of claim 8, further comprising:
determining, when the communication condition is normal, whether at least one of a use state and a memory use state of a portable terminal is one of normal and abnormal; and generating, when the at least one of the use state and the memory use state is abnormal, a signal for requesting the one or more MIME types set by the user.

12. The method of claim 11, wherein the use state comprises at least one of a call service mode, a Short Message Service (SMS) service mode, and a hand-off process.

13. The method of claim 11, further comprising determining whether the memory use state of a portable terminal is normal or abnormal by comparing a reference remaining memory capacity, stored in the portable terminal, with determined memory occupancy when the portable terminal is connected to the server.

* * * * *